INVENTOR.
William G. Farin

INVENTOR.
William G Farin

INVENTOR.
William G. Farin

United States Patent Office 3,425,477
Patented Feb. 4, 1969

3,425,477
METHOD FOR HEAT RECOVERY IN EVAPORATING AND BURNING SPENT LIQUOR
William G. Farin, Neenah, Wis., assignor to Marathon Engineering, Inc., Menasha, Wis., a corporation of Wisconsin
Filed Sept. 28, 1966, Ser. No. 582,672
U.S. Cl. 159—48                                9 Claims
Int. Cl. B01d 1/14

ABSTRACT OF THE DISCLOSURE

A method of evaporating and burning spent cooking liquors wherein the spent liquor is direct contact evaporated and heated by the flue gas from the burned liquor. The heated liquor is flash evaporated to a vacuum and the flashed vapor utilized to preheat the liquor prior to its being recycled and reheated by the flue gas. The flue gas is also utilized to heat water, the heated water used to heat liquor and the liquor flash evaporated to a vacuum.

---

This invention relates to a method of evaporating and burning waste or spent liquors obtained from chemical processes. More particularly it relates to utilizing the heat generated from burning of concentrated liquor to obtain more efficient evaporation and concentration of the dilute feed liquor, and also to the preventing of scale formation on heat exchanger surfaces. The method is particularly applicable to the treatment of spent cooking liquors obtained from the pulping process in the manufacture of paper and pulp from cellulosic materials.

When spent cooking liquor is removed from the treated pulp it is normally at a solids concentration in the range of 8% to 17%. In the recovery process, the dilute liquor is usually concentrated in multi-effect evaporators and its combustible contents then burned in a suitable furnace or fluidized reactor to recover the included inorganic chemicals while generating useable heat. The heat value of the burned material is normally utilized to produce steam in furnace boilers, and in some cases, may also be used to supplement evaporation by direct contact between the liquor and the hot flue gases.

In order to obtain reasonable heat recovery efficiency, recovery furnaces with large boiler and air preheating surfaces are employed to produce high pressure steam. After producing energy, the discharged steam must also be further utilized in the multiple effect evaporators to concentrate the initial 8% to 17% consistency of the feed liquor to a burning consistency of 50% to 70% solids. The initial cost of recovery boilers and evaporators is extremely high. Corrosion problems and fouling of heat exchanger surfaces by scaling also contribute to high operation and maintenance costs. Serious explosions may also occur in the recovery furnace when tubes, weakened by corrosion, rupture to spill feed water into the furnace chamber.

Capital costs may be reduced by using fluidized bed reactors followed by boilers, which permit burning at lower consistencies, thus reducing evaporator size requirements. However, this entails considerable sacrifice in economy of operation. Capital cost may be further reduced by utilizing heat from the reactor or burner for direct contact evaporation which eliminates the boiler and reduces evaporator size. However, economy is again compromised, since auxiliary boiler steam must be used to operate the smaller evaporator.

A major problem involved in conventional evaporation of spent cooking liquor where heat exchangers are used is excessive scaling. The most troublesome scaling results from reverse solubility salts, such as calcium sulfate. Heating of the liquor during evaporation reduces the solubility of the salts and causes a high degree of supersaturation with such reverse solubility salts, causing salting out and incrustation on the heat exchanger surfaces in the form of scale. As a result, frequent shutdowns are necessary for cleaning. This in turn requires large storage capacity for feed liquor during shutdown, or necessitates extra heat exchanger surfaces to enable operation of alternate units while others are being cleaned.

Conventional evaporator operation also release volatile chemicals from the liquor such as sulfur dioxide, which are absorbed in the condensed condensate making them difficult to recover. In addition to causing loss of valuable chemicals, such absorption contributes adversely to pollution abatement problems.

As set forth below, the present invention eliminates to a large extent many of the above problems by more effectively utilizing direct contact evaporation between flue gas and spent liquor. Accordingly it is the principle object of this invention to provide more effective heat recovery when utilizing direct contact evaporation in the concentration of spent pulping liquor, while preventing scale formation on heat exchanger surfaces, and enabling efficient recovery of chemicals.

It is a further object to provide improved evaporation while reducing capital cost requirements.

An additional object is to provide improved economy in operation of recovery equipment for spent liquors.

Other objects and advantages will become apparent to persons skilled in the art upon examination of the drawings and specification, the scope of the invention being defined in the appended claims.

Figure 1:
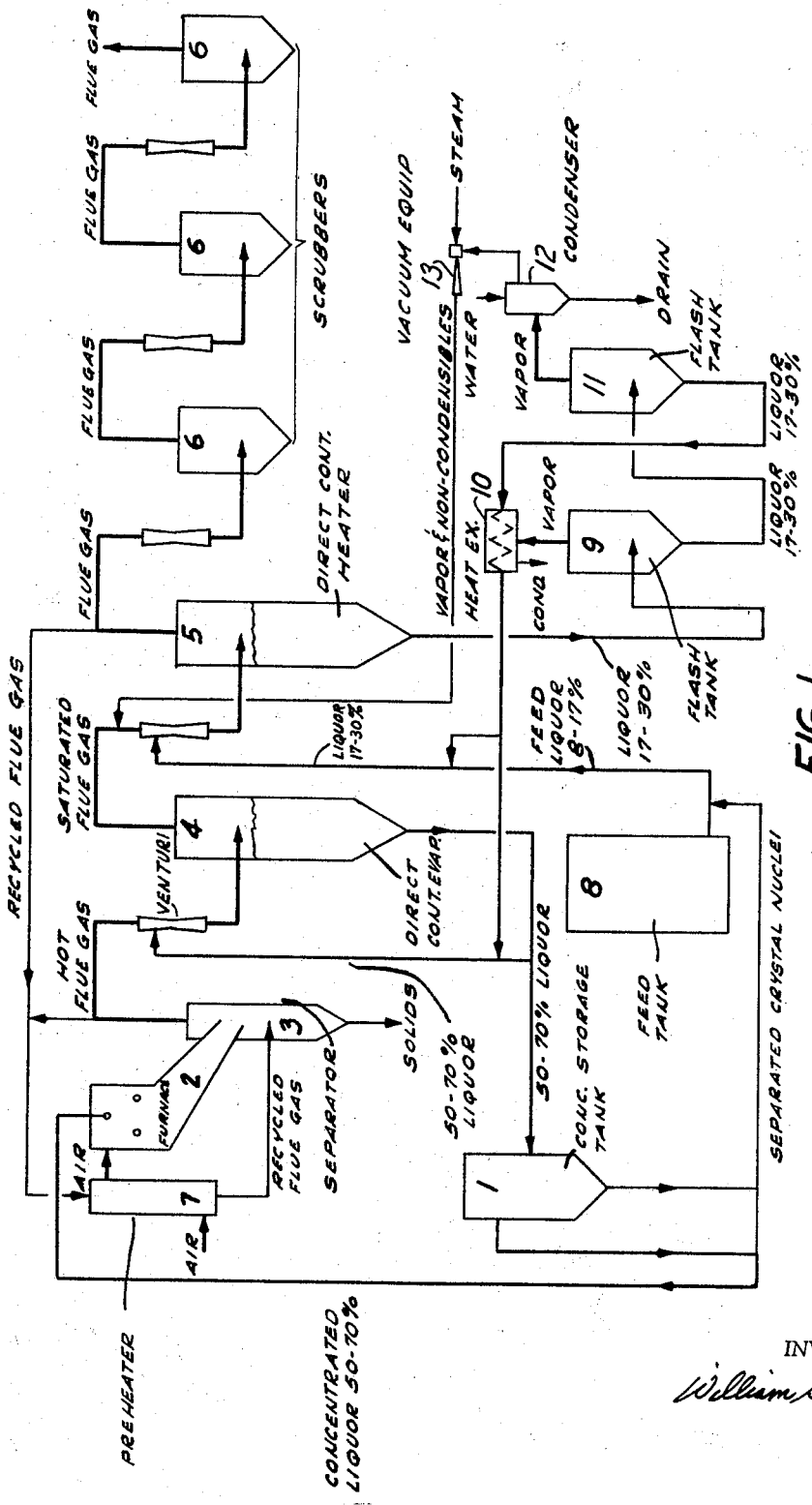
FIGURE 1 is a schematic flow diagram showing a heat recovery and evaporation system for spent pulping liquor incorporating the present invention in conjunction with a furnace.

Before referring to the specific embodiments of the invention illustrated by the drawings, a brief description of the improved process of this invention will be set forth.

To start operation, preconcentrated liquor from storage is burned, generating hot flue gas. The flue gas is then fed into direct contact with spent liquor being fed to a direct contact evaporator. The dry flue gas draws moisture from the liquor, thus concentrating the liquor in the evaporator up to the time when the flue gas approaches its saturation point. Under these conditions, and while the flue gas draws moisture from the liquor, the liquor temperature normally drops, due to the evaporation effect. When the flue gas approaches its saturation point, however, heat from the flue gas will transfer to the liquor and the liquor temperature will increase up to its evaporation temperature. If further heating by the flue gas were allowed after reaching the evaporation temperature, the liquor temperature would not rise further and the heat would be converted to further evaporation.

While the latter condition contributes to additional evaporation, in the improve process it is advantageous to avoid heating the liquor with flue gas after the evaporation temperature is reached. It is preferred that the direct contact evaporation from the liquor be permitted to continue until the flue gas approaches its saturation point, and then controlling the process so that the heat remaining in the flue gas at this stage is utilized to increase the temperature of the liquor only up to its evaporation point. The additional heat imparted to the liquor by the flue gas is then utilized by immediately flash evaporating the heated liquor to lower pressures and temperatures by vacuum induction. Concentration of the liquor thus is provided first by direct contact evaporation and then by flash evaporation. By recirculating sufficient quantities of liquor subsequently cooled by flash evaporation, the exit temperature of the flue gas leaving the direct contact evaporator can be controlled and dropped considerably below the liquor evaporation temperature. Heat recovery from the flue gas is thereby increased, and overall economy improved accordingly.

Ordinarily, direct contact evaporation is not considered efficient, since it requires in the range of 1,000 B.t.u. of heat per pound of water evaporated. In the improved process, however, the flue gas heat used to heat the liquor, can be repeatedly used for multiple effect or multiple stage flash evaporation, to substantially increase the water evaporation from the heat available. This is done by giving the heated liquor a series of additional flashes at successively lower pressures and temperatures, with the final flashed vapor handled in condensing and vacuum equipment. After final flashing, the cooled and concentrated liquor is returned to the direct contact evaporators through heat exchangers which have condensed the higher temperature flashed vapors and transferred the heat back to the liquor. The liquor is thus preheated by each stage of flashed vapor before being returned to the direct contact unit for final heating. The flue gas heat absorbed by the liquor, as above described, is thus utilized for multiple stage heating and multiple stage economies are possible. Accordingly, the cost savings realized from using direct contact evaporation is enhanced by operation economies resulting in using the heat generated by the burning liquor for multiple stage evaporation.

The heat generated by the burning liquor is in the range of 5,000 to 8,000 B.t.u. per pound of dry solids burned, depending on the type of material burned. From 2,000 to 5,000 B.t.u. per pound of dry solids will be required to evaporate the 2 to 5 pounds of water per pound of dry solids needed to bring the flue gas up near its saturation point. The balance of the heat in the flue gas is available for liquor heating. The actual amount of water evaporation from the liquor needed to bring the flue gas up near its saturation point will depend on the regulated temperature of the flue gas leaving the direct contact evaporator and the amount of excess air used in the combustion of the liquor.

In the improved process, it is also possible to obtain multiple economy from the water evaporated by direct contact. As previously mentioned, sufficient water evaporation is permitted from the spent liquor so that the flue gas approaches its saturation point, at the temperatures prevailing in the direct contact evaporator. This flue gas, when discharged, can then be cooled by direct contact with a circulating water stream. In so doing, a good percentage of the water evaporated from the liquor and picked up by the flue gas by direct contact, will be condensed due to the reduced saturation point of the flue gas at the lower temperature. This heat of condensation will be picked up by the circulating water stream and can then be utilized in a heat exchanger to also heat liquor. The liquor, so heated, can be flash evaporated in the same manner as that previously described for evaporating the liquor heated by direct contact. In this manner, multiple economies are obtained by reusing flue gas heat remaining after direct contact evaporation.

When most of the heat of combustion of the liquor is utilized directly for steam generation, instead of for direct contact evaporation, additional heat is often required for evaporation. The improved process is also highly adaptable for multiple stage utilization of other waste heats, and supplementary steam when necessary, to satisfy dilute liquor evaporation requirements. In such cases, when steam, digester blow vapor, or other waste steam is added to the flue gas ahead of the contact evaporator, it serves to add heat content which is transferred directly to the contacted liquor when the flue gas is saturated. In this way, the heat from these other vapors, which otherwise might be wasted, can be utilized in heating liquor which is subsequently treated in the described multiple stage flash evaporation system.

Other sources of heat such as steam, hot water from the blow heat, heat from other recovery sources, as well as the previously mentioned heat from the flue gas cooler can also be utilized in heating the circulated liquor in the multiple stage flash evaporation system. This can be done by supplementing the heating of the same stream of circulating liquor, or a separate circulating loop may be heated and flashed back to the same or separate flash tanks.

A portion of the flue gas and vapor can also be recycled back from the exit of the direct contact unit to reduce temperatures, cool noncombustible solids, prevent chemical breakdown and control corrosion. Preferential recycling of flue gas, high in water vapor content, will reduce water evaporation in the contact evaporator and enable use of a higher percentage of the heat for direct contact heating of the liquor. This increases the heat available for multiple stage flash evaporation from direct contact liquor heating and improves the overall economy of the system.

The flue gases vented in the improved process are cooled in the direct contact evaporator or heat recovery cooler and the degree of cooling can be controlled to be discharged at temperatures best suited for efficient recovery of chemicals.

In the described system, the dilute liquor can be evaporated to burning consistency and heated in a single direct contact unit, or two or more units may be provided to concentrate the liquor in stages. In the latter system final concentration to burning consistency and temperature is done by direct contact evaporation in the first unit contacted by the flue gas. Liquor at lower concentration is then heated in the second unit contacted by the flue gas. By flash evaporating the liquor from the second unit at lower liquor consistencies, higher heat transfer rates and more efficient pumping is possible.

A holdup time may also be provided in the direct contact evaporators to release the supersaturation created by heating and concentrating liquors containing reverse solubility salts, such as calcium sulfate. Nuclei can be provided by carry over from the burner or by recycling sludge from the concentrated liquor storage or cyclone separators, to the feed liquor system. By providing ½ to 5 minutes holdup time in the presence of at least 1% crystal nuclei to act as seed, the reverse solubility salts can be precipitated at this point of maximum supersaturation, and within the direct contact evaporator itself where there is no contact with heat exchanger surface. When the heated liquor is subsequently cooled in the flash evaporation system, the solubility of the reverse solubility salts in the cooled liquor is increased. The liquor, having had its supersaturation removed in the direct contact evaporator at the peak temperature, is no longer saturated after cooling. After flash cooling, the liquor can then be reheated in the heat exchangers without danger of creating supersaturation at the temperatures encountered. By thus avoiding a supersaturated condition in the heat exchangers, undesirable scaling is prevented in the exchangers. Supersaturation will reoccur only when the liquor is recirculated to the direct contact evaporators where peak temperature will be reached and where salts will again be seeded by the nuclei and be precipitated.

Now, referring to the drawings:

In the arrangement shown in FIGURE 1, concentrated liquor at 50% to 70% solids is fed from storage tank 1 to furance 2, where it is burned. The hot flue gas from furnace 2 passes to cyclone separator 3, where noncombustible solids are collected for chemical recovery. Solids not collected, are carried with the flue gas into the first direct contact evaporator 4 and used as nuclei for seeding to release the supersaturation of the liquor being recirculated to contact evaporator assubsequently described. Only one contact evaporator is necessary but two can be used to advantage as shown. When two are used, the first contact evaporator 4, is the final liquor concentrating unit. Liquor fed to the first contact evaporator 4 comes from heat exchanger 10 and may be recirculated at burning consistency. It is withdrawn from evaporator 4 at burning consistency. The temperature of the withdrawn liquor preferably is also kept high in the first contact unit to facilitate burning.

The second direct contact unit 5, uses exhaust flue gases from unit 4, and handles less concentrated liquor largely from spent liquor storage tank 8 at lower temperature. The flue gas entering the second contact unit 5, contains all the moisture picked up from the liquor treated in the first contact unit 4. Most of the remaining heat available in the flue gas is therefore utilized in heating the liquor contacted in the second contact unit 5, since the flue gas is already near its saturation point.

A portion of the flue gas vented from the second unit 5, may also be recycled along with some hot flue gas, to control the temperatures in the furnace air preheater 7, as shown by the flow lines. It can also serve to cool the noncombustible solids in the separator 3, and to control the discharge flue gas temperature. The balance of the flue gas vented from the second unit 5, is processed through recovery scrubbers 6, to scrub out desirable chemicals before venting.

The main supply of dilute feed liquor at 8% to 17% solids concentration is pumped from storage tank 8 to the circulating stream returning from heat exchanger 10 and entering the second contact unit 5. Sludge or crystal nuclei from the final product storage tank 1, can also be circulated back to the feed system leaving storage tank 8, to act as nuclei for seeding, to precipitate out the calcium sulfate and other reverse solubility salts in the liquor being treated. After contact evaporation or heating by the flue gas, the liquor in the second contact unit 5, is preefrably held up for ½ to 5 minutes in the presence of the crystal nuclei to release the supersaturation at its peak, i.e., the highest temperature point in the circulating cycle. The heated liquor from the contact unit 5, having its supersaturation released, is then flashed to a lower pressure and temperature in flash tank 9. The flashed vapor is used to heat recirculating liquor passing through the exchanger 10. Either a single flash or multiple flashes may be used depending on the operating efficiency desired. In FIGURE 1 two flash tanks are shown. After the second flash in flash tank 11, the vapor goes to condenser 12 with the noncondensibles handled by suitable vacuum equipment 13.

The flashed liquor is pumped from the bottom of flash tank 11 through heat exchanger 10, where it is reheated before being returned to contact evaporator 5 or forwarded to contact evaporator 4. The liquor pumped through heat exchanger 10 has already had its supersaturation released at peak temperature so there is no danger of scaling as explained below. When the liquor is flashed to lower temperatures in the flash tanks the solubility of calcium sulfate and other reverse solubility salts is increased and the liquor is no longer saturated. The temperature at which the recirculating liquor will again become saturated is not reached when heated in the heat exchanger. By thus avoiding the supersaturation normally encountered in sulfite liquor evaporator heat exchangers, scaling is prevented.

Liquor from the second contact evaporator or heater 5, after going through flash tanks 9 and 11 and heat exchanger 10, is either recirculated to the second contact evaporator 5 or advanced to the first contact evaporator 4 where final concentration is achieved as previously described. Here again, holdup time in contact with the crystal nuclei may be provided to lease supersaturation and avoid scaling. Concentrated liquor passes on to storage tank 1, where sludge can be separated out before the liquor goes to the furnace for combustion.

Figure 2:
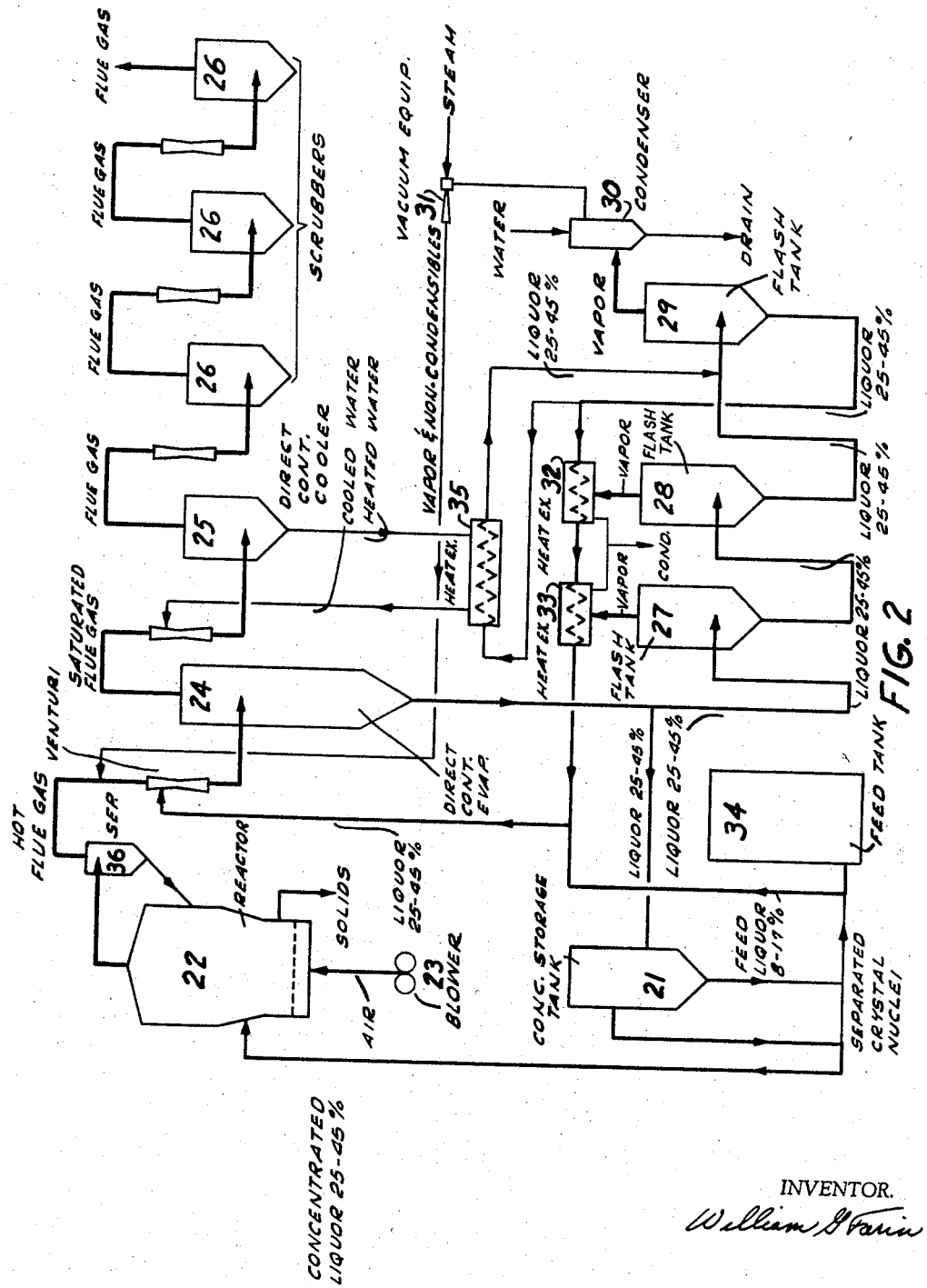
FIGURE 2 is a schematic flow diagram showing a heat recovery and evaporation system incorporating the present invention in conjunction with a fluidized bed reactor.

In the arrangement shown in FIGURE 2, liquor at 25% to 45% solids is fed from storage tank 21 to the fluidized bed recator 22 for burning. A blower 23 supplies the air for combustion and noncombustible solids are removed from the side of the reactor 22. The flue gas passes through separator 36 to minimize carry over of entrained solids. Collected solids are returned to the reactor 22. The flue gas is then forwarded from sepaartor 36 to heat the liquor in single direct contact evaporator heater 24. The flue gas discharged from direct contact evporator 24 then passes on to a cooler 25 to recover the heat of the condensed vapors and to scrubbers 26 to recover chemicals from the gas before venting.

In the FIGURE 2 arrangement evaporation and liquor heating take place in a single contact unit, and the liquor circulated is essentially at the final concentration required for burning. Supersaturation is released in direct contact unit 24 by providing sufficient holdup time in the presence of crystal nuclei acting as seed and the discharged liquor from contact unit 24 is circulated in succession to flash tanks 27, 28, and 29 where it is flash evaporated at successively lower pressures and temperatures. The vapor from tank 29 is handled in condenser 30 and the noncondensibles in suitable vacuum equipment 31. The liquor from flash tank 29 is pumped back through heat exchangers 32 and 33 where it is reheated by the vapors discharged from flash tanks 28 and 27 respectively. The reheated liquor is then joined by the feed liquor from storage tank 34 before being returned to the direct contact unit 24 for a final reheating and repetition of the cycle. A portion of the circulated liquor is withdrawn immediately after contact evaporation and forwarded to the concentrated storage tank 21 to feed to the reactor.

The heat of condensation from the water evaporated from the treated liquor by direct contact evaporation, and condensed from the flue gas by cooling in direct contact cooler 25, is picked up with a circulating water stream and used for additional liquor heating in heat exchanger 35. The portion of the liquor thus heated is then flash evaporated again in flash tank 29. Thus some of the heat initially used for direct contact evaporation in contact evaporator 24, is recovered due to condensing in the cooler 25, transferred to the liquor in heat exchanger 35 and used again for flash evaporating the liquor in flash tank 29. This provides two evaporations rather than one from the liquor when the flue gas heat is utilized twice in this manner.

Figure 3:
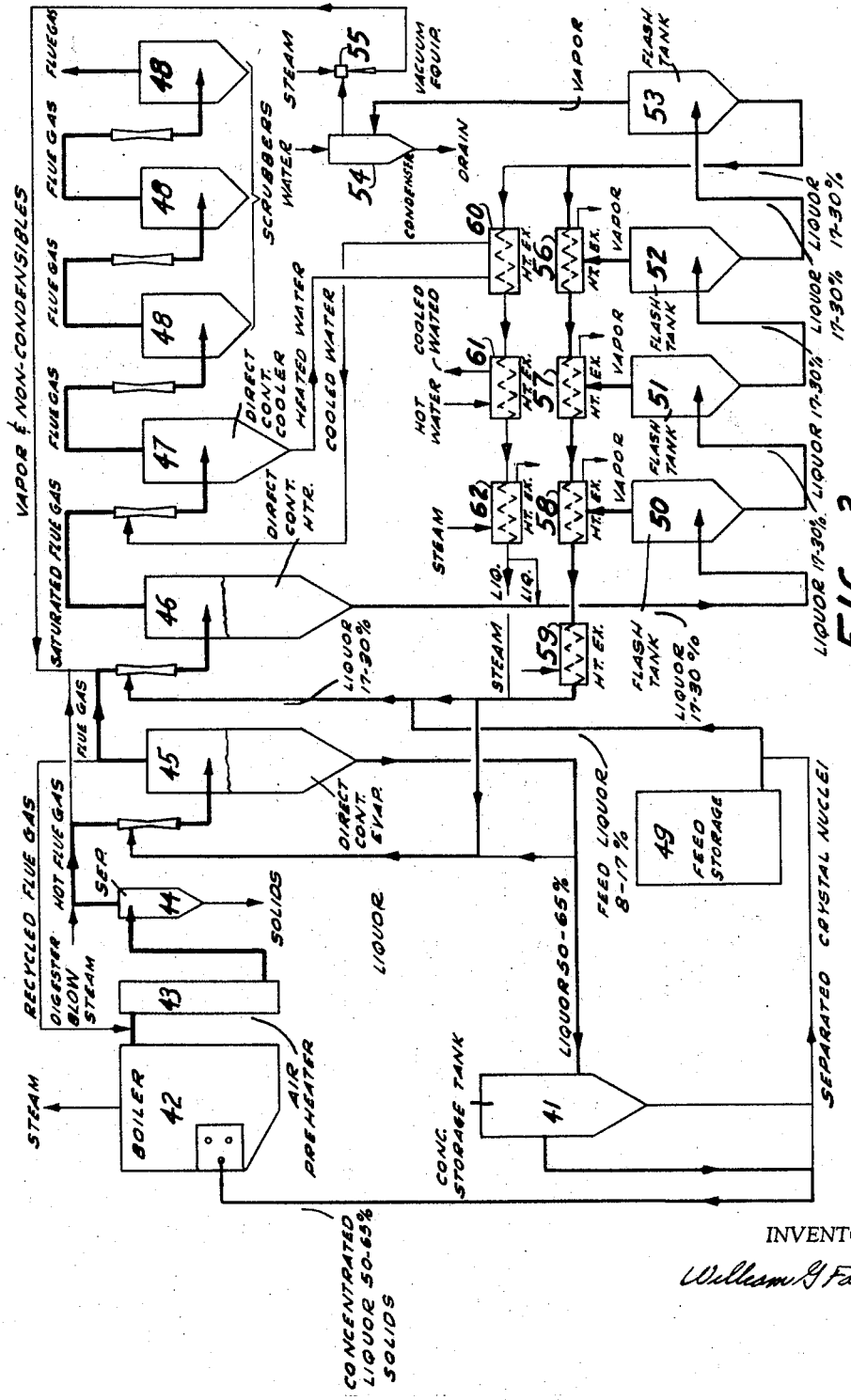
FIGURE 3 is a schematic flow diagram showing a heat recovery and evaporation system incorporating the present invention in conjunction with a heat recovery boiler.

In the arrangement shown in FIGURE 3, concentrated liquor at 50% to 65% solids concentration is fed from storage tank 41 to a recovery boiler 42 where the liquor is burned and steam is generated. The flue gas from boiler 42 goes through air preheater 43 and cyclone separator 44 where noncombustible solid chemicals can be recovered, and then goes to direct contact evaporator 45.

The flue gas may also be supplemented with waste steam before it goes to the direct contact evaporator 45, where the flue gas contacts, concentrates, and heats the liquor to its final burning consistency and temperature. Some of the flue gas vented from contact evaporator 45 may be recycled to control the temperatures in the air preheater 43 and the product collection system 44. The balance of the flue gas from contact evaporator 45 joins a portion of the flue gas from separator 44 which by-passes unit 45 and is used for direct contact evaporation and heating liquor of lower concentration which is fed to second direct contact unit 46 from dilute liquor storage 49.

The flue gas vented from direct contact unit 46 is cooled in direct contact cooler 47. Here some of the water evaporated from the liquor in units 45 and 46 is condensed out by a circulating stream of water at lower temperature. The flue gas vented from the direct contact cooler 47, passes on to the scrubbers 48, for recovery of desired chemicals before venting.

The dilute feed liquor from storage tank 49, is supplemented with recycled sludge from the concentrated liquor storage tank 41 to bring the crystal nuclei concentration up above 1%. The feed liquor then joins that portion of the circulating stream of liquor from heat exchangers 56, 57, 58 and 59 going to the direct contact heater 46, where it is heated by direct contact with the flue gas as described previously. The heated liquor is held up in the direct contact heater 46 with the crystal nuclei acting to seed out and release the supersaturation created by heating and concentrating.

The liquor heated in the second direct contact heater 46, then passes to flash tanks 50, 51, 52, and 53 in succession, where it is flash evaporated at successively lower pressures and temperatures. The flashed vapors from flash tanks 50, 51 and 52 are condensed in heat exchangers 58, 57 and 56 respectively. The flashed vapors from flash tank 53 are handled in condenser 54 and suitable vacuum equipment 55. The liquor from flash tank 53, cooled by flash evaporation, is recirculated through and reheated in heat exchangers 56, 57 and 58 by heat derived from condensation of the flashed vapors. Some additional heat can also be given the liquor when necessary by supplementary steam heating in heat exchanger 59 before being returned to direct contact heater 46.

After the supersaturation has been released in the second direct contact evaporator 46 at peak temperature and peak supersaturation point, the liquor circulated will not become supersaturated again with reverse solubility salts until it again approaches the peak temperature. The liquor temperatures reached in heat exchangers 56, 57, 58 and 59 are well below such peak temperature. By thus avoiding the supersaturation condition at the heat exchangers, scaling is prevented on the heat exchanger surfaces.

The water heated in the direct contact cooler 47 is circulated and transfers the heat of condensation from the flue gas vapors condensed to heat exchanger 60. A separate stream of circulated liquor from flash tank 53 picks up the heat in heat exchanger 61 from hot water recovered from sources such as the digester blow heat recovery or the like. Steam can also be utilized in heat exchanger 62 to supply additional heat to the circulated liquor when needed. The recirculating liquor heated by heat exchangers 60, 61 and 62 can pass on to direct contact heater 46 as shown or be flash evaporated direct to any of the flash tanks 50, 51, 52 or 53, depending on the temperature obtained by heating in the heat exchangers. This heat is thus utilized successively in the multiple stage flash evaporation system and multiple economies may also be obtained from the heat supplied to heat exchangers 60, 61 and 62.

A portion of the recirculated liquor going to the direct contact heater 46 is diverted to supply direct contact evaporator 45. The concentrated liquor obtained in evaporator 45 is recirculated after a holdup provided to release supersaturation, with a portion forwarded to concentrated storage tank 41 to supply the recovery boiler 42.

A variety of equipment may be used in the methods defined by this invention. The liquor may be burned in a burner, boiler, recovery boiler, furnace or fluidized bed reactor. The direct contact evaporation or heating may be effected in a contact evaporator, cocurrent or countercurrent scrubber, cyclone evaporator or venturi scrubber. The evaporation may be effected in flash evaporation steps or by means of a standard multiple effect device.

While several and specific embodiments of the inventive concept have been set forth herein, it is understood that the invention is not to be construed as limited thereby, and that suitable changes, modifications and variations may be made without departing from the spirit and scope of the invention as defined in the appended claims.

What I claim is:

1. A method for more efficiently using the heat from flue gases generated by burning concentrated spent liquor than is normally attained by direct contact evaporation, which comprises directly contacting partially concentrated spent liquor with said hot flue gases, maintaining contact for a period sufficient to raise the moisture content of the flue gas to near its saturation point, causing heat from said flue gas to transfer to said partially concentrated spent liquor to raise the temperature of said liquor, flash evaporating said heated liquor to a lower pressure and temperature by vacuum induction, adding heat to said flashed liquor to raise the temperature thereof and again flash evaroprating the liquor to the same lower prssure and temperature by vacuum induction.

2. The method set forth in claim 1 wherein heat is transferred between said liquor and said flue gas equalizing the temperatures thereof near the flue gas saturation temperature.

3. The method set forth in claim 1, wherein said flash evaporated and reheated liquor is recirculated into contact with said flue gas for additional reheating and flash evaporation.

4. The method set forth in claim 3, in which said partially concentrated spent liquor heated by the flue gas is subjected to a number of successive flash evaporation steps at successively lower pressures and temperatures, and wherein the vapors from said flash evaporation steps are utilized to reheat said flashed liquor.

5. The method set forth in claim 3, wherein said partially concentrated spent liquor is supplied with crystal nuclei before contact with said hot flue gases, said nuclei having been previously separated from said concentrated spent liquor before burning thereof.

6. The method set forth in claim 3, wherein the partially concentrated spent liquor is heated to supersaturation temperature by said nearly saturated flue gas and the heated liquor held near saturation temperatures for from ½ to 5 minutes, to release said supersaturation before being flash evaporated.

7. The method set forth in claim 1, wherein waste steam is injected into the hot flue gas before contact with said spent liquor.

8. The method set forth in claim 1, wherein a portion of the said flue gas cooled in direct contact evaporation is recirculated back to the discharge from the burning step to control temperature whereby the flue gas is cooled sufficiently to prevent corrosion on collection equipment.

9. A method for more efficiently using the heat from flue gas generated by burning concentrated spent liquor than is normally attained by direct contact evaporation; which comprises directly contacting partially concentrated spent liquor with said hot flue gases, maintaining contact for a period sufficient to raise the moisture content of the flue gas to near its saturation point, causing heat to transfer between said flue gas and said spent liquor to equalize the temperatures thereof and further concentrate said partially concentrated spent liquor, cooling said hot flue gases by subsequent direct contact with a circulating water stream to recover the heat of condensation at the reduced saturation point of the cooled flue gas, circulating said resulting heated water stream through a heat exchanger to heat a flow of said partially concentrated liquor, and flash evaporating by vacuum induction said flow of partially concentrated liquor at a pressure and temperature below the pressure and temperature to which said partially concentrated liquor was raised by said heat exchanger.

References Cited

UNITED STATES PATENTS

| | | | |
|---|---|---|---|
| 2,839,122 | 6/1958 | Laguiharre | 159—4 |
| 3,153,609 | 10/1964 | Markant et al. | 162—36 |
| 3,280,009 | 10/1966 | Ackermann et al. | 203—9 |

FOREIGN PATENTS 55,555  12/1920  Sweden.

NORMAN YUDKOFF, *Primary Examiner.*

J. SOFER, *Assistant Examiner.*

U.S. Cl. X.R.

159—16, 2, 4, 45; 162—47